US009481525B1

(12) United States Patent
Dunham et al.

(10) Patent No.: US 9,481,525 B1
(45) Date of Patent: Nov. 1, 2016

(54) VIBRATORY CONVEYOR

(71) Applicants: Dean D. Dunham, Walla Walla, WA (US); Christopher A. Woiler, College Place, WA (US); Jeffrey Sloop, College Place, WA (US); Michael T. Jones, Walla Walla, WA (US); Eugene Groenewald, Woerden (NL); Koby J. Campbell, West Richland, WA (US); Mark Schmidtgall, Athena, OR (US)

(72) Inventors: Dean D. Dunham, Walla Walla, WA (US); Christopher A. Woiler, College Place, WA (US); Jeffrey Sloop, College Place, WA (US); Michael T. Jones, Walla Walla, WA (US); Eugene Groenewald, Woerden (NL); Koby J. Campbell, West Richland, WA (US); Mark Schmidtgall, Athena, OR (US)

(73) Assignee: Key Technology, Inc., Walla Walla, WA (US)

( * ) Notice: Subject to any disclaimer, the term of this patent is extended or adjusted under 35 U.S.C. 154(b) by 0 days.

(21) Appl. No.: 14/835,911

(22) Filed: Aug. 26, 2015

(51) Int. Cl.
*B65G 27/16* (2006.01)
*B65G 27/20* (2006.01)
*B65G 27/04* (2006.01)
*B65G 27/26* (2006.01)

(52) U.S. Cl.
CPC .............. *B65G 27/20* (2013.01); *B65G 27/04* (2013.01); *B65G 27/26* (2013.01)

(58) Field of Classification Search
CPC ...... B65G 27/00; B65G 27/12; B65G 27/16; B65G 27/20; B65G 27/18
USPC ................ 198/752.1, 758, 763, 761, 766
See application file for complete search history.

(56) References Cited

U.S. PATENT DOCUMENTS

| 4,313,535 A * | 2/1982 | Carmichael | B65G 27/08 198/763 |
| 5,178,259 A * | 1/1993 | Musschoot | B65G 27/32 198/753 |
| 5,265,730 A * | 11/1993 | Norris | B07B 1/42 198/770 |
| 5,713,457 A * | 2/1998 | Musschoot | B65G 27/30 198/753 |
| 6,041,915 A * | 3/2000 | Fishman | B65G 27/20 198/766 |
| 6,655,523 B2 * | 12/2003 | Jones | B65G 27/08 198/763 |
| 6,851,548 B1 * | 2/2005 | Dumbaugh | B65G 27/32 198/758 |
| 8,181,592 B2 * | 5/2012 | Karpinsky | A21C 15/002 118/13 |

* cited by examiner

*Primary Examiner* — James R Bidwell
(74) *Attorney, Agent, or Firm* — Randall Danskin PS (57) ABSTRACT

A vibratory conveyor is described and which includes a base frame; a reciprocally moveable conveyor bed supported by elongated springs and which are attached to each of the conveyor bed, and the base frame, and four unbalanced motors mounted on the base frame, and wherein the unbalanced motors when selectively energized, generate a vibratory force which is transmitted to the reciprocally moveable conveyor bed, and where, selective energizing of the four unbalanced motors can effect the movement of a product along the conveyor bed at a selectively variable speed in a manner not possible heretofore.

10 Claims, 4 Drawing Sheets

VIBRATORY CONVEYOR

TECHNICAL FIELD

The present invention relates to an excited frame vibratory conveyor, and more specifically to conveyors which utilize vibratory motion for the distribution, collection, or transfer of a product along a path of travel.

BACKGROUND OF THE INVENTION

Vibratory conveying systems are commonly used in the food, and other industries, and where belt-type conveyors are undesirable, or where it is difficult to maintain the conveyors in a sanitary condition. Vibratory conveyors make use of a conveyor bed which includes an elongated tray which is made to vibrate predominately in a desired direction, and at an angle such that materials deposited on the bed will migrate or travel, at a selected speed, from an infeed end of the vibratory bed to a discharge end, thereof.

Excited frame vibratory conveying devices are known in the art. For example, U.S. Pat. No. 4,313,535, which is incorporated by reference herein, shows an exemplary excited frame conveying apparatus that has performed well in the past for transporting bulk product over relatively short distances. As a general matter, excited frame conveyors similar to that which is described, above, include a vibratory drive mounted on an elongated frame. The frame is supported or located on supporting surface, and the bed of the conveyor receives and moves product along the conveyor length. A resilient suspension in the form of leaf, or beam springs, project upwardly at spaced intervals along the frame and are inclined in the direction of the intake or infeed end of the conveyor. The elongated conveyor or product transporting bed is mounted on the upper ends of the respective beam or leaf springs. The conveyor bed is supported by the beam or leaf springs in a generally parallel relationship to the frame, and in a substantially overall, horizontal, orientation. Due to the resiliency of the respective beam or leaf springs, the product conveying bed is capable of reciprocally moving relative to the frame in response to a force applied to the bed by the vibratory drive mounted on the frame. During operation of the vibratory drive produces an oscillating or reciprocating vibratory force. This force may be generated by rotating eccentric weights mounted on the vibratory drive. As will be recognized, the vibratory drive is mounted on the frame and therefore imparts vibratory motion to the frame which is then transferred through the beam or leaf springs to the conveyor bed. As a result, the conveyor bed vibrates at substantially the same frequency as the drive and frame.

It should be understood that a conveyor bed that is displaced from its "at rest" position and then allowed to oscillate freely will oscillate at its natural or harmonic frequency. This frequency is dependent upon the combined spring constant, the number of springs supporting the conveyor bed, as well as the mass of the bed relative to the mass of the supporting frame.

As a general matter, and for conveyors of this design, less vibration and force is transferred to the underlying floor or other supporting structure by an excited frame conveyor because of the small vibrational amplitude of the frame as compared to the vibrational amplitude of the reciprocally moveable product conveying bed. The low level of vibrational force transferred to the surrounding structure is a chief advantage of the prior art excited frame vibratory conveyors.

While excited frame conveyors have worked with a great deal of success for a number of decades, several shortcomings have continued to present themselves during their use in various industries segments. Chief among these shortcomings relates to the difficulty in controlling the speed of product flow along the vibratory conveyor bed during operation. While it has long been known that the drive assemblies may be altered to provide different product flow characteristics, the adjustment from one flow characteristic to another often requires the addition or replacement of eccentric weights, or the substitution of new drives to achieve the change in the product speed. Further other difficulties with excited frame conveyors present themselves as the length of the conveyor bed, increases. Various schemes have been devised through the years for operating these longer length excited frame conveyors in a manner which avoids the problems associated with the excitation of frame structural frequency modes that may result in undesirable and even destructive motion of the conveyor bed or an entire conveyor system. A previous patent which addresses this problem is seen in U.S. Pat. No. 6,655,523, the teachings of which are incorporated by reference herein. Therefore, a vibratory conveyor which avoids the problems associated with the excited frame conveyors which are described in the prior art, and employed heretofore, is the subject matter of the present invention.

SUMMARY OF THE INVENTION

A first aspect of the present invention relates to a vibratory conveyor which includes a base frame mounted on an adjacent supporting surface; a multiplicity of elongated springs mounted on the base frame, and where each of the elongated springs have a distal end; a reciprocally moveable conveyor bed which is mounted on the distal end of the respective elongated springs, and which further is supported for reciprocal motion relative to the base frame; and four unbalanced motors which are mounted on the base frame, and which, when selectively energized, generates a vibratory force which is transmitted or oriented along a line of force, and which passes through the reciprocally moveable conveyor bed, and wherein the vibratory force causes the reciprocally moveable conveyor bed to reciprocate, and have a variable stroke, and which effects the movement of a product, at a selectively variable speed, along the reciprocally moveable conveyor bed.

Still another aspect of the present invention relates to a vibratory conveyor which includes a base frame mounted on an adjacent supporting surface, and wherein the base frame has a frame portion which is located in spaced relation relative to the supporting surface; a multiplicity of elongated springs each having a proximal end which is affixed to the frame portion of the base frame, and an opposite, distal, and second end, and which is positioned in spaced relation relative to the frame portion of the base frame; a reciprocally moveable conveyor bed having a product transporting surface, and wherein the conveyor bed has a first intake end, and an opposite, exhaust end, and wherein the distal, second end of the respective elongated springs are affixed to the conveyor bed, and further supports the conveyor bed in spaced, reciprocally moveable relation relative to the base frame, and wherein the reciprocally moveable conveyor bed has a center of mass; and a multiplicity of unbalanced motors which rotate eccentric weights, and which create a vibratory force which is directed along a line of force which passes through the center of mass of the reciprocally moveable conveyor bed, and wherein the multiplicity of unbalanced motors are mounted on the base frame, and wherein the selective energizing of the multiplicity of unbalanced motors imparts a variable stroke to the reciprocally moveable conveyor bed and enables the reciprocally moveable conveyor bed to move a product at a variable speed along the product transporting surface.

These and other aspects of the invention will be discussed in greater detail hereafter.

BRIEF DESCRIPTION OF THE DRAWINGS

Preferred embodiments of the invention are described, below, with reference to the following accompanying drawings.

DETAILED DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

Figure 1:
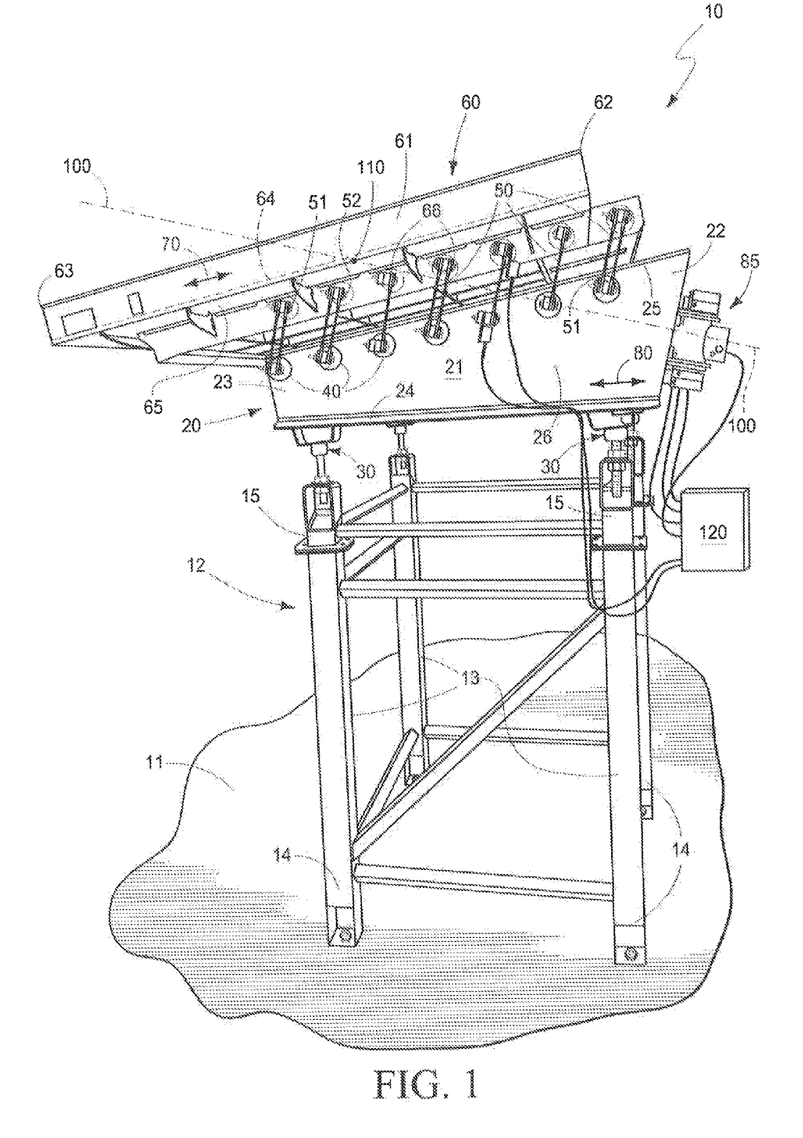
FIG. 1 is a side elevation view of the vibratory conveyor of the present invention.
Figure 2:
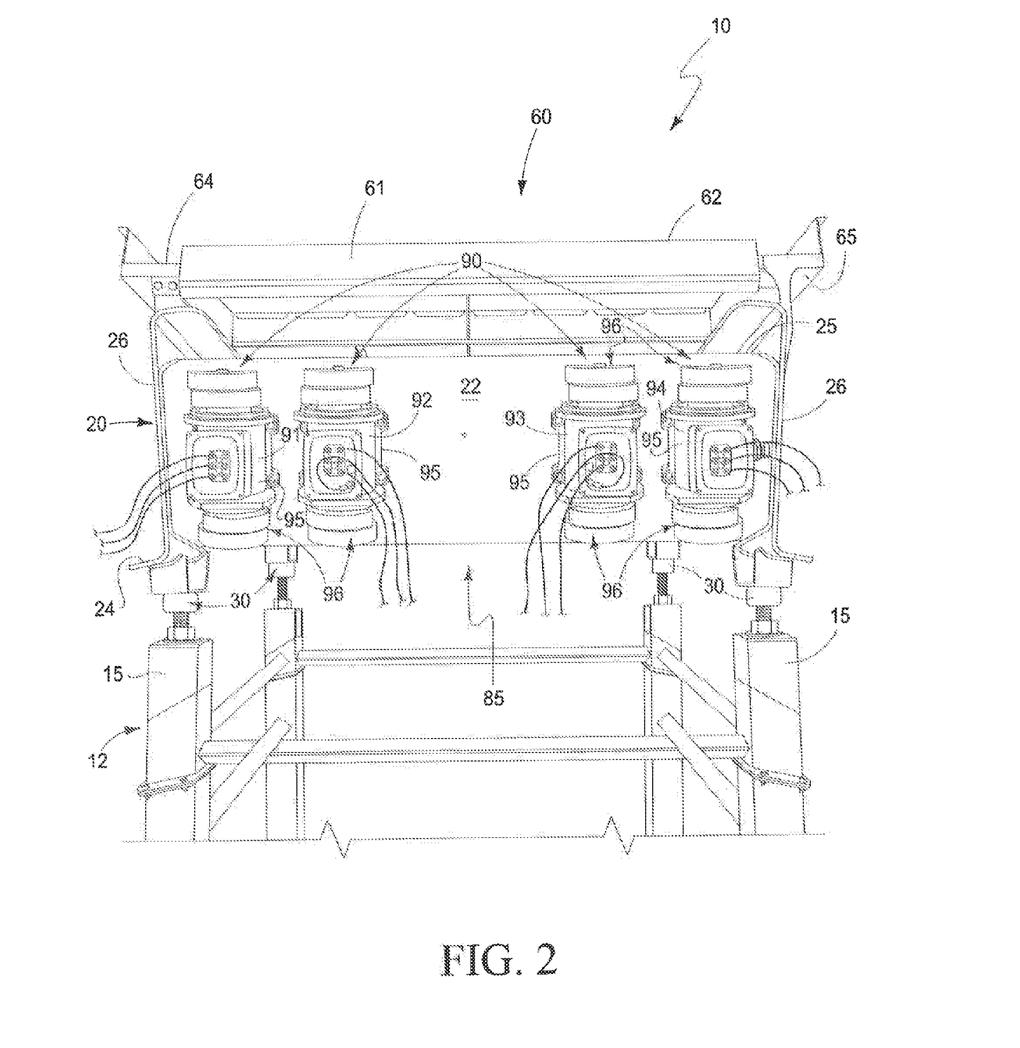
FIG. 2 is an end view of the vibratory conveyor as seen in FIG. 1.

The vibratory conveyor of the present invention is generally indicated by the numeral 10, and is best seen in FIGS. 1 and 2, respectably. In this regard, the vibratory conveyor 10 is of an excited frame design or type. The vibratory conveyor 10 is supported or otherwise oriented on a supporting surface 11. In FIG. 1 it will be understood that the supporting surface 11 is positioned below the vibratory conveyor 10. However, and in certain industrial applications, the vibratory conveyor may be positioned, or otherwise suspended from an overhead ceiling or bulkhead, not shown. The vibratory conveyor is positioned in spaced relation relative to the supporting surface 11 by an elevating frame which is generally indicated by the numeral 12. The elevating frame positions the vibratory conveyor 10 in a location so that it may provide a product stream (not shown) to a downstream processing device. The elevating frame 12 is formed of a multiplicity of vertical members 13. The multiplicity of vertical members are joined together by individual, transversely disposed frame pieces which are fastened to the respective vertical members 13 by welding or the like. The multiplicity of vertical members 13 have a proximal end 14 which is supported by and rests upon the supporting surface 11, and further includes an opposite, and distal, second end 15, and upon which the vibratory conveyor 10 is located or mounted.

The vibratory conveyor 10 of the present invention includes a base frame 20 which is mounted on the adjacent and supporting surface 11. The base frame 20 has a frame portion, as described, below, and which is located in spaced relation relative to the supporting surface 11, and further has a main body 21 which has a first end 22, and an opposite second end 23. The base frame is defined by a bottom frame portion 24, and a top frame portion 25 which is spaced therefrom. Still further the main body 21 has an exterior facing surface 26. As best seen by reference to FIG. 1, the bottom frame portion 24 is affixed to individual vibration isolators 30. The vibration isolators 30 are fastened to the respective distal ends, 15, of the individual vertical members forming the elevating frame 12. This construction is well-known in the art.

As seen in FIG. 1, and following, a multiplicity of spring mounts are positioned in given, predetermined spaced relation on the main body 21 of the base frame 20, and positioned near the top frame portion 25 thereof. The spring mounts are of conventional design and are operable to be releasably coupled to a multiplicity of elongated springs which are generally indicated by the numeral 50. The springs, as illustrated, comprise well known, narrowly rectangular leaf springs of conventional design. However, other elongated springs which may be formed in the shape of rods which have a substantially circular cross-section may be used in place of the leaf springs as illustrated. The multiplicity of elongated springs 50 have a first, or proximal end 51, and which is fastened, by a suitable threaded fastener to at least one of the multiplicity spring mounts 40, and which are further mounted on the top frame portion 25 of the base frame 20. The respective elongated springs 50 have a second, or distal end 52, and which is positioned in predetermined, spaced relation relative to the top frame portion 25.

As seen in FIG. 1, and following, a reciprocally movable conveyor bed which is generally indicated by the numeral 60 is positioned in a predetermined, spaced relationship relative to the base frame 20, and is further supported for reciprocal motion relative thereto by the multiplicity of elongated springs 50. In this regard, the reciprocally movable conveyor bed 60 has a main body 61 which has first, intake end 62, and an opposite, second or exhaust end 63. The main body 61 is defined, in part, by a top, product conveying or transporting surface 64, and which extends between the first and second ends 62 and 63, thereof. It should be understood that the product transporting surface 64 receives products or a stream of objects that need to be transported, and thereafter, by reciprocal motion, moves the products or objects, not shown, from the first end 62 to the second end 63. In this regard, the main body 61 further has a bottom surface 65. As seen in FIG. 1, a multiplicity of spring mounts 66 are mounted on or near the bottom surface 65, and on the opposite sides of the main body 61, so as to matingly cooperate with the second or distal end 52 of the respective multiplicity of elongated springs 50. The elongated springs are operable to facilitate the reciprocal motion of the main body 61 of the movable conveyor bed 60 in an advantageous manner so as to effect the movement of a product or stream of objects from the first end 62, to the second end 63, thereof.

As seen in FIG. 1, the energizing of the vibratory conveyor 10, as will be discussed in the paragraphs which follow, effects the reciprocal motion 70 of the conveyor bed 60. This reciprocal motion is defined by a predetermined stroke having a length dimension. This is seen in FIG. 1 by the greatly exaggerated line labeled 70. The reciprocal motion 70, and which is defined by the stroke of the reciprocally movable conveyor bed 60, determines, in large measure, the speed with which a product or stream of objects move between the first intake end 62, and the second, exhaust end 63. Heretofore, the speed of movement of a product or object stream has been predominately determined by the drive assembly, and which was attached to the base frame 20. To effect a change in the speed of the product typically required a change in the drive assembly including, on some occasions, a removal and/or substitution of the electric motors, as will be discussed, below, and/or a change in the size and arrangement of the eccentric weights which are rotated by the electric motors was necessary. This is well understood in the art, and a further discussion regarding same is not necessary. It should be understood by a study of FIG. 1, and when energized, the vibratory conveyor 10, can under some operational conditions, also impart reciprocal motion, 80, to the base frame 20. The implications of this reciprocal motion of the base frame 20 relative to the conveyor bed 60 will be discussed in the paragraphs which follow.

The vibratory conveyor 10 of the present invention includes a selectively actuatable drive assembly 85, and which is formed of a multiplicity of unbalanced motors that are generally indicated by the numeral 90. The multiplicity of unbalanced motors includes first, second, third, and fourth unbalanced motors 91-94 respectively, and which are mounted in a predetermined location, and angular orientation on the first end 22 of the base frame 20 (FIG. 2). The respective unbalanced motors 91-94 each include a selectively energizable electric motor 95 which rotates eccentric weights 96 of traditional design. The selective energizing of the respective multiplicity of unbalanced motors 90 generates a line of force which is generally indicated by the numeral 100. This line of force 100 extends through the center of mass 110, of the reciprocally movable conveyor bed 60. In this arrangement, the energizing of the respective multiplicity of unbalanced motors 90 effects a reciprocal motion 70 of the movable conveyor bed 60, having a predetermined stroke, and which causes a product or stream of objects to move, at a predetermined speed, from the first intake end 62, to the second exhaust end 63, thereof.

Figure 3A:
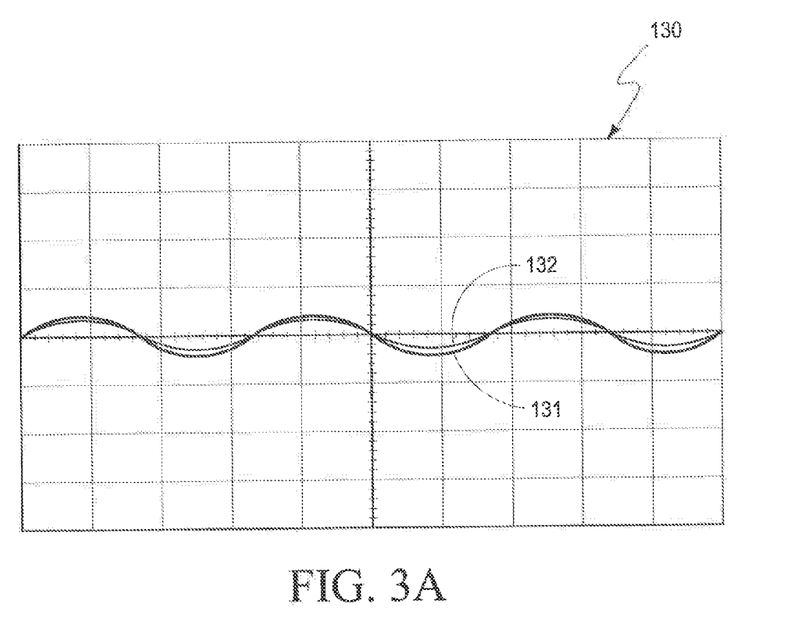
FIG. 3A is a graphical depiction of the vibratory motion of the vibratory conveyor of the present invention and which is operating below its design point, and where two unbalanced motors are being energized.

The vibratory conveyor 10 of the present invention also includes a controller 120 which is operable to selectively energize the multiplicity of unbalanced motors 90 in a predetermined fashion, and which further allows the vibratory conveyor 10 to control the speed with which a product or stream of objects are transported between the first and second ends 62 and 63 of the reciprocally moveable conveyor bed 60. This feature is novel inasmuch as controlling or providing a variable speed for a product or object flow on an excited frame conveyor has not been possible without substantial alterations to the drive assembly and which has often taken a significant period of time to accomplish. In this regard, it should be understood that prior art excited frame conveyors when fabricated, heretofore, are manufactured in a fashion such that each vibratory conveyor has a specific design point. This design point is based upon a weight ratio which has been experimentally determined over time. This design point weight ratio is based upon the weight of the vibratory conveyor bed 60 which is being employed, and the base frame 20 supporting same. In this regard, one of the most effective design points for an excited frame vibratory conveyor is when the weight ratio of the base frame 20, and the reciprocally moveable conveyor bed 60 lies in a ratio of about 3:1. This weight ratio typically insures that the reciprocal motion 70 of the vibratory conveyor bed 60 does not impart, or only minimally imparts vibration to the base frame 20 during operation. Referring now to FIG. 3A; and following, a graphical depiction of the vibratory motion of the present invention 10 is depicted when selective numbers of unbalanced motors 90 are energized below the design point; at the design point; and above the design point of the vibratory conveyor 10. With regard to FIG. 3A, this drawing depicts the operational condition of the present invention 10 when two unbalanced motor 90 are energized so as to create a vibratory force which is transmitted along the line of force 100, and which causes reciprocal motion 70 of the moveable conveyor bed 60 below the design point of the vibratory conveyor 10. This operational condition is general indicated by the numeral 130. It should be understood from the graphical depiction in this drawing that the vibratory movement of the reciprocally moveable conveyor bed 60 is indicated by the line labeled 131; and the vibrational or reciprocal movement of the base frame is indicated by the line labeled 132. It will be appreciated from a study of this drawing that when a pair of unbalanced motors 90 are energized below the design point of the vibratory conveyor 10, the vibratory motion of both the reciprocally moveable conveyor bed 60,131, and the base frame 20,132 is observed. In particular it should be noted that with respect to the lines 131 and 132 that this vibratory motion of the vibratory conveyor bed 60, and the base frame 20 are in-phase with each other. When this vibratory motion is in-phase as seen in FIG. 3A, the flow of any product or object stream along the vibratory conveyor bed 60 either does not exist, or is only in a very nominal amount.

Figure 3B:
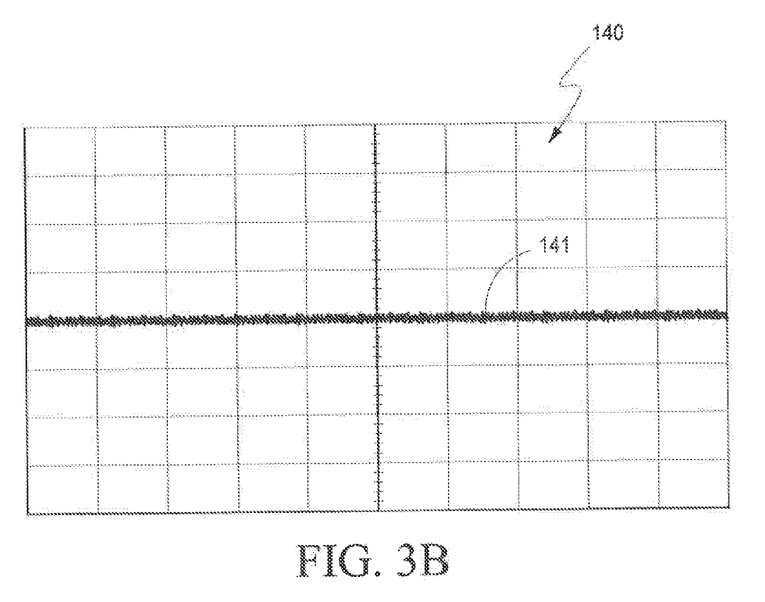
FIG. 3B is a graphical depiction of the vibratory motion of the vibratory conveyor of the present invention and which is operating below its design point, and where four unbalanced motors are being energized.

Referring now to FIG. 3B, the operational condition of the vibratory conveyor 10, is graphically depicted, and where four (4) unbalanced motors 90 are energized below the design point, and is generally indicated by the numeral 140. When four unbalanced motors 90 are energized, the conveyor bed 60, and base frame 20 remain substantially motionless. This is contrast to that which is seen in FIG. 3A, and where only a pair of unbalanced motors 90 are operated and energized. The teaching from these two drawings clearly illustrates that the energizing of four (4) unbalanced motors 90 effectively cancels the vibratory motion of both the base frame 20, and the reciprocally moveable conveyor bed 60 below the design point of the vibratory conveyor 60.

Figure 4A:
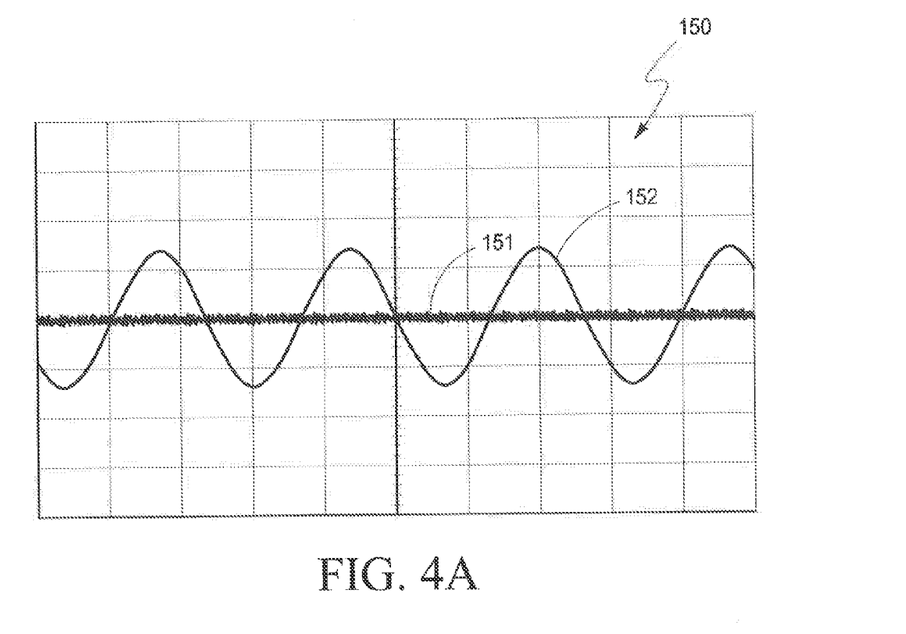
FIG. 4A is a graphical depiction of the vibratory motion of the vibratory conveyor of the present invention and which is taken when two unbalanced motors are operating at the design point of the vibratory conveyor.

Referring now to FIG. 4A, a graphical depiction is provided with respect to the operational condition of the vibratory conveyor 10, and when either two or four unbalanced motors 90 are energized at the design point of the vibratory conveyor 10. As seen in this graphical depiction 150, the line labeled 151 represents the vibratory movement of the base frame 151 which is substantially motionless, and line 152 represents the vibratory motion of the reciprocally moveable conveyor bed 60. This vibratory or reciprocal movement 70 is effective to move product from the intake end 62 to the exhaust end 63 at a given speed. The speed is reflective of the amplitude of the vibratory movement of the vibratory conveyor bed 60, as earlier described. In this regard, the vibratory motion of the vibratory conveyor bed 60 when two unbalanced motors are energized, at the design point, typically has a stroke length of about 3-4 mm. On the other hand when four (4) unbalanced motors are energized, at the design point, the stroke length of the vibratory conveyor 60 is about 6-8 mm.

Figure 4B:
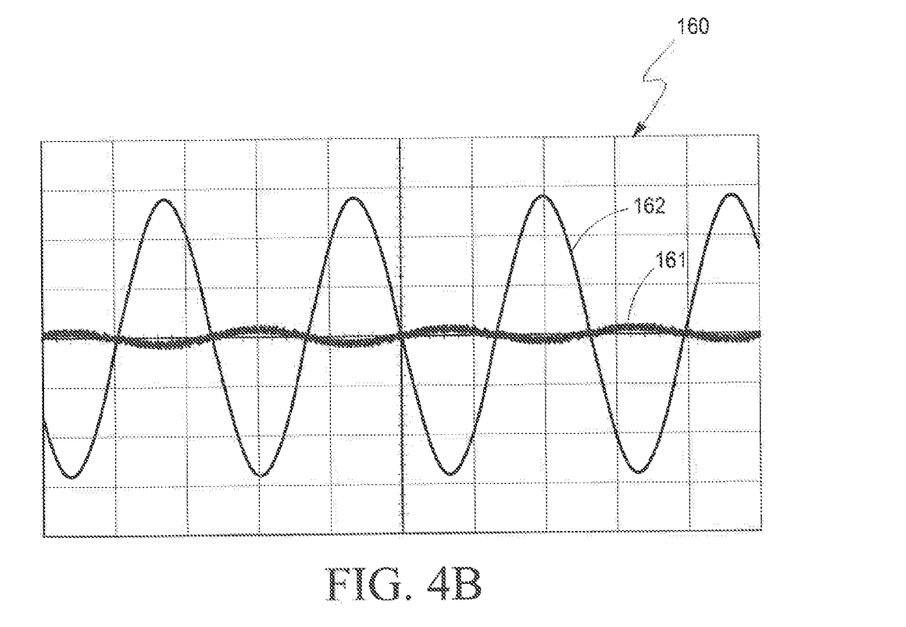
FIG. 4B is a graphical depiction of the vibratory motion of the present invention and which is taken at the design point of the present invention, and when four unbalanced motors are being energized.

Referring now to FIG. 4B, a graphical depiction is provided and which shows the operational condition of the vibratory conveyor 10, and when four (4) unbalanced motors 90 are energized to create vibratory energy which is above the design point of the vibratory conveyor 10. Those skilled in the art would expect an operational condition to emerge and which has been seen with prior art excited frame vibratory conveyors in the past, and where, once the level of vibratory force imparted by the drive assembly 85 has exceeded the design point of the vibratory conveyor 10, then the base frame 20 would begin to reciprocally move in a manner which is out-of-phase with the vibratory motion 70 of the reciprocally moveable conveyor bed 60. This out-of-phase movement would cancel, at least in part, the vibratory motion 70 of the conveyor bed 60. If this state is allowed to continue for a prolonged period of time, an "over-stroking" condition can be created, and where excessive reciprocal movement of the vibratory conveyor 60, in combination with the out-of-phase movement of the base frame 20, may result in a catastrophic failure of the excited frame conveyor. Contrary to what might be expected from experience, and as seen in FIG. 4B, and when the aforementioned operational condition exists, and four unbalanced motors are energized, above the design point of the vibratory conveyor 10, the vibratory motion as reflected by the base frame 161 remains relative low (less than about 2 mm.). However, the vibratory motion of the vibratory conveyor 60,162 as reflected in the length of the stroke, increases dramatically. In this regard the stroke of vibratory conveyor is measured at about 8-10 mm when 4 unbalanced motors are energized, as opposed to 4-5 mm., and when only two unbalanced motors 90 are energized. Surprisingly, the amount of motion of the base frame 20 remains at less than about 2 mm., notwithstanding that 4 unbalanced motors are energized. This increase in the stroke of the vibratory conveyor bed 60 corresponds with an increase in the speed of the product or object stream flow along the reciprocally moveable conveyor bed 60. It should be appreciated that the stroke, as reflected by the reciprocal motion 70, can be varied by the controller 120 so as to increase the speed of object flow when the four motors 90 are energized and operating from the design point, to substantially above the design point. In other words, a variable flow of the product or objects is now possible. This is a surprising result inasmuch as a variable flow of product with an excited frame conveyor has not been possible heretofore using the teachings known in the art with the exception of changing the drive assembly 85, or by employing flow restriction devices such as gates, and the like, along the vibratory conveyor bed 60. This invention provides many advantages for a vibratory conveyor of this design, and further allows improved methodologies for processing products in a fashion not known and available in the art, heretofore.

Operation

The operation of the described embodiment of the present invention is believed to be readily apparent, and is briefly summarized at this point. In its broadest aspect, the vibratory conveyor 10 of the present invention includes a base frame 20 which is mounted on an adjacent supporting surface 11, and which further includes a multiplicity of elongated springs 50 which are mounted on the base frame 20. Each of the elongated springs have a distal end 52. The vibratory conveyor 10 includes a reciprocally moveable conveyor bed 60 which is mounted on the distal end 52 of the respective elongated springs 50, and which further is supported for reciprocal motion relative to the base frame 20. The present invention 10 also includes four unbalanced motors 90 which are mounted on the base frame 20, and which, further, when selectively energized, generates a vibratory force which is generated along a line of force 100, and which passes through the reciprocally moveable conveyor bed 60. The vibratory force causes the reciprocally moveable conveyor bed 60 to reciprocate 70, and have a variable stroke, and which affects the movement of a product or stream of objects at a selectively variable speed along the reciprocally moveable conveyor bed 60.

As presently disclosed, the multiplicity of elongated springs 50 may take on a shape or form and where they are narrowly rectangular, and substantially planar leaf springs. In another possible form of the invention 10, the multiplicity of the elongated springs 50 may come in the form of individual resilient rods which have a substantially circular, cross-sectional shape. In the present form of the invention as disclosed, the reciprocally moveable conveyor bed 60, and base frame 20 each have a given weight. In this regard the respective weights of the base frame 20, and the conveyor bed 60 remain in a ratio of about 3:1. This weight ratio of 3:1 constitutes a design point for the vibratory conveyor 10.

In the arrangement as disclosed in the present invention 10, the reciprocally moveable conveyor bed 60 has a center of mass 110. As presently designed, the line of force 100 passes through the center of mass 110 of the vibratory conveyor bed 60. In the arrangement as seen in the drawings, the four unbalanced motors 90 can be selectably energized, in pairs, by means of a controller 120. It should be understood that the controller 120, is operable to selectively energize the pairs of unbalanced motors 90 in a manner so as to cause the reciprocally moveable conveyor bed 60 to reciprocate relative to the base frame 20, and in a fashion which is below the design point; at the design point; and/or above the design point of the vibratory conveyor 10. As seen in the drawings, and more particularly to reference 3A, the present invention 10, and in a first mode of operation 130, two of the four unbalanced motors 90 are energized so as to create a vibratory force which causes a stroke 70 which is below the design point of the vibratory conveyor 60, and which further causes both the reciprocally moveable conveyor bed 60, and the base frame 20 to reciprocate, in-phase, and in an amount of less than 2 millimeters. In a second mode of operation 140, and as best seen by reference to FIG. 3B, the controller 120 is operable to energize all four unbalanced motors 90 so as to create a vibratory force which is below the design point of the vibratory conveyor 10. In this arrangement, and in this condition, the vibratory force which is generated causes the reciprocally moveable conveyor bed 60, and the base frame 20 to remain substantially motionless.

In a third mode of operation 150, the vibratory conveyor 10 of the present invention, is best seen in FIG. 4A, and is operable to energize two of the four unbalanced motors 90 so as to create a vibratory force which is substantially at the design point of the vibratory conveyor 10. In this third mode of operation 150, this vibratory force causes the reciprocally moveable conveyor bed 60 to reciprocate in a fashion where it has a stroke of about 3 to about 4 millimeters. In this mode of operation 150, the base frame 20 remains substantially motionless.

In a fourth possible mode of operation, all four unbalanced motors 90 are energized so as to create a vibratory force which is substantially at the design point of the vibratory conveyor, and which further causes the reciprocally moveable conveyor bed to reciprocate in a fashion where it has a stroke of about 6 to about 8 millimeters and the base frame remains substantially motionless. This is, of course, twice the stroke distance as displayed when only two unbalanced motors are energized and roughly doubles the product speed along the vibratory conveyor bed 60. In still another, fifth mode of operation, two of the four unbalanced motors 90 are energized so as to create a vibratory force which is above the design point of the vibratory conveyor 10. In this condition, the reciprocally moveable conveyor bed 60 reciprocates in a fashion and where it has a stroke of about 4 to 5 millimeters, and the base frame 20 reciprocates over a distance of less than about 2 millimeters. In this condition (above the design point), the reciprocation of the reciprocally moveable conveyor bed 60, and the base frame 20 are out-of-phase. As earlier discussed, if this condition is allowed to exist for a prolonged period of time, a potential "over stroking" condition can emerge and which, if not remedied, may result in a catastrophic failure of the excited frame conveyor. In a sixth mode of operation, and as best seen by reference to FIG. 4B, and when all four unbalanced motors 90 are energized, so as to create a vibratory force which is above the design point of the vibratory conveyor 10, this vibratory energy causes the reciprocally moveable conveyor bed 60 to reciprocate in a fashion and where it has a stroke length of about 8 to 10 millimeters, and wherein the base frame 20 reciprocates over a distance of less than about 2 millimeters. Again this is a surprising result in view of past experience and where the energizing of merely two motors 90 and a "over stroking" condition can rapidly escalate and cause a catastrophic failure of an excited frame conveyor. However, what has been discovered, is that by energizing four unbalanced motors 90, above the design point, an increased stroke of the reciprocally moveable conveyor bed 60 can be achieved and results in only a minor amount of vibratory motion being imparted to the base frame 20. Stated in another way, when four unbalanced motors 90 are energized above the design point the vibratory conveyor acts and respond in a similar fashion as it might respond if only two unbalance motors were energized above the design point. However the amplitude of the vibration and resulting stroke which is seen is much greater as seen in FIG. 4A. By employing appropriate vibratory feed-back sensors which are coupled to the controller 120, this observed effect permits the controller 120 to proportionally vary and increase the speed when the four motors 90 are energized. This condition also allows a variable flow of products or objects along the reciprocally moveable conveyor bed 60 to be achieved. This newly discovered feature provides numerous advantages for excited frame conveyors which have not been generally considered to be variably controllable as to speed heretofore.

Therefore the present invention, as described, provides many advantages over the prior art, excited frame conveyors which have been utilized for decades, heretofore. The present invention is robust, reliable, and provides a variable product flow speed and further offers a reliable means to stop the flow of objects or products which are moving along the vibratory conveyor bed, and which has not always been possible with the prior art devices of similar design.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the Doctrine of Equivalents.

We claim:

1. A vibratory conveyor, comprising:
   a base frame mounted on an adjacent supporting surface;
   a multiplicity of elongated springs mounted on the base frame, and where each of the elongated springs have a distal end;
   a reciprocally moveable conveyor bed which is mounted on the distal end of the respective elongated springs, and which further is supported for reciprocal motion relative to the base frame, and wherein the reciprocally moveable conveyor has a center of mass, and wherein the base frame, and the reciprocally moveable conveyor bed each have a given weight, and wherein the respective weights are in a ratio of about 3:1, and which constitutes a design point for the vibratory conveyor;
   four unbalanced motors which are mounted on the base frame, and which, when selectively energized, generates a vibratory force which is oriented along a line of force, and which passes through the center of mass of the reciprocally moveable conveyor bed, and wherein the vibratory force causes the reciprocally moveable conveyor bed to reciprocate, and have a variable stroke, and which effects the movement of a product, at a selectively variable speed along the reciprocally moveable conveyor bed, and wherein the four (4) unbalanced motors can be selectively energized in pairs, and the pairs of unbalanced motors can be energized in a manner so as to cause the reciprocally moveable conveyor bed to reciprocate relative to the base frame, and in a fashion which is below the design point; at the design point; and/or above the design point of the vibratory conveyor, and wherein in a first mode of operation the unbalanced motors are selectively energized so as to create a vibratory force which is below the design point of the vibratory conveyor, and which further causes both the reciprocally moveable conveyor bed, and the base frame to reciprocate, in-phase, and in an amount of about 2 mm.

2. A vibratory conveyor as claimed in claim 1, and wherein in a second mode of operation all four unbalanced motors are energized so as to create a vibratory force which is below the design point of the vibratory conveyor, and which further causes the reciprocally moveable conveyor bed, and the base frame to remain substantially motionless.

3. A vibratory conveyor as claimed in claim 2, and wherein in a third mode of operation two of the four unbalanced motors are energized so as to create a vibratory force which is substantially at the design point of the vibratory conveyor, and which further causes the reciprocally moveable conveyor bed to reciprocate in a fashion where it has a stroke of about 3 to about 4 mm., and wherein the base frame remains substantially motionless.

4. A vibratory conveyor as claimed in claim 3, and wherein in a fourth mode of operation all four unbalanced motors are energized so as to create a vibratory force which is substantially at the design point of the vibratory conveyor, and which further causes the reciprocally moveable conveyor bed to reciprocate in a fashion where it has a stroke of about 6 to about 8 mm., and wherein the base frame remains substantially motionless.

5. A vibratory conveyor as claimed in claim 4, and wherein in a fifth mode of operation, two of the four unbalanced motors are energized so as to create a vibratory force which is above the design point of the vibratory conveyor, and which further causes the reciprocally moveable conveyor bed to reciprocate in a fashion and where it has a stroke of about 4 to about 5 mm., and wherein the base frame reciprocates over a distance of less than about 2 mm., and wherein the reciprocation of the reciprocally moveable conveyor bed and the base frame are out-of-phase.

6. A vibratory conveyor as claimed in claim 5, and wherein in sixth mode of operation, all four of the unbalanced motors are energized so as to create a vibratory force which is above the design point of the vibratory conveyor, and which further causes the reciprocally moveable conveyor bed to reciprocate in a fashion and where the vibratory conveyor bed has a stroke of about 8 to about 10 mm., and further the base frame reciprocates over a distance of less than about 2 mm.

7. A vibratory conveyor, comprising:
a base frame mounted on an adjacent supporting surface, and wherein the base frame has a frame portion which is located in spaced relation relative to the supporting surface;
a multiplicity of elongated springs each having a proximal end which is affixed to the frame portion of the base frame, and an opposite distal, and second end, and which is positioned in spaced relation relative to the frame portion of the base frame;
a reciprocally moveable conveyor bed having a product transporting surface, and wherein the conveyor bed has a first intake end, and an opposite, second, exhaust end, and wherein the distal, second end of the respective elongated springs are affixed to the conveyor bed, and further supports the reciprocally moveable conveyor bed in spaced, reciprocally moveable relation relative to the base frame, and wherein the reciprocally moveable conveyor bed has a center of mass, and wherein the base frame, and the reciprocally moveable conveyor bed each have a given weight, and wherein the respective weights are in a ratio of about 3:1, and which constitutes a design point for the vibratory conveyor; and
four unbalanced motors which rotate eccentric weights, and which create a vibratory force which is directed along a line of force which passes through the center of mass of the reciprocally moveable conveyor bed, and wherein the four unbalanced motors are mounted on the base frame, and wherein the selective energizing of the four unbalanced motors imparts a variable stroke to the reciprocally moveable conveyor bed and enables the reciprocally moveable conveyor bed to move a product at a variable speed along the product transporting surface, and wherein the vibratory conveyor when energized by utilizing two unbalanced motors creates a vibratory force having a given frequency based upon the design point of the vibratory conveyor, and wherein the two unbalanced motors, when energized to create a vibratory force which is below the design point of the vibratory conveyor causes the reciprocally moveable conveyor bed, and the base frame, to reciprocate substantially in-phase, and wherein when two unbalanced motors are energized to create a vibratory force which is substantially at the design point of the vibratory conveyor, the reciprocally moveable conveyor bed reciprocates in a manner where it has a given stroke, and the base frame is substantially motionless, and wherein the two unbalanced motors, when energized to create a vibratory force which is above the design point of the vibratory conveyor, causes the reciprocally moveable conveyor bed, and the base frame, to both reciprocate in a manner which is out-of-phase, and wherein the given stroke of the reciprocally moveable conveyor bed increases.

8. A vibratory conveyor as claimed in claim 7, and wherein the vibratory conveyor when selectively energized by utilizing four unbalanced motors creates a vibratory force having a given frequency based upon the design point of the vibratory conveyor, and wherein the four unbalanced motors, when selectively energized to create a vibratory force which is below the design point of the vibratory conveyor, causes the reciprocally moveable conveyor bed, and the base frame, to remain substantially motionless, and wherein, when the four unbalanced motors are selectively energized to create a vibratory force which is above the design point of the vibratory conveyor, the reciprocally moveable conveyor bed reciprocates in a manner where it has a stroke which is greater than the given stroke as generated when just two unbalanced motors are energized, and wherein the base frame experiences only a minimal amount of vibratory motion as the stroke of the reciprocally moveable conveyor bed increases.

9. A vibratory conveyor as claimed in claim 8, and wherein the reciprocally moveable conveyor bed has a stroke of about 3 to about 4 mm. at the design point of the vibratory conveyor when two unbalanced motors are energized; and wherein the stroke of the reciprocally moveable conveyor bed, at the design point, is about 6 to about 8 mm. when 4 unbalanced motors are energized; and wherein the stroke of the reciprocally moveable bed, above the design point, is about 8 to about 10 mm. and the reciprocal motion of the base frame is less than about 2 mm. when the 4 unbalanced motors are energized.

10. A vibratory conveyor as claimed in claim 9, and wherein the reciprocally moveable conveyor bed has a given stroke when the four unbalanced motors are energized, at the design point, of the vibratory conveyor, and wherein the base frame remains substantially motionless.

* * * * *